United States Patent
Luger et al.

(10) Patent No.: US 7,733,679 B2
(45) Date of Patent: Jun. 8, 2010

(54) METHOD FOR SETTING SWITCHING TIMES, IN PARTICULAR IDLE TIMES, OF AN INVERTER BASED ON DETECTED POWER, AND INVERTER

(75) Inventors: Andreas Luger, Kaltenberg (AT); Clemens Bittmann, Wels (AT)

(73) Assignee: Fronius International GmbH, Pettenbach (AT)

(*) Notice: Subject to any disclaimer, the term of this patent is extended or adjusted under 35 U.S.C. 154(b) by 256 days.

(21) Appl. No.: 10/577,336

(22) PCT Filed: Oct. 29, 2004

(86) PCT No.: PCT/AT2004/000382
§ 371 (c)(1),
(2), (4) Date: Apr. 28, 2006

(87) PCT Pub. No.: WO2005/043738
PCT Pub. Date: May 12, 2005

(65) Prior Publication Data
US 2007/0030717 A1   Feb. 8, 2007

(30) Foreign Application Priority Data
Oct. 31, 2003   (AT)   .............................. A 1733/2003

(51) Int. Cl.
*H02M 7/5387* (2007.01)
(52) U.S. Cl. ............................. 363/98; 363/41; 323/906
(58) Field of Classification Search ................... 363/98, 363/41, 21.03, 56.04, 132; 323/906

See application file for complete search history.

(56) References Cited

U.S. PATENT DOCUMENTS
5,625,539 A * 4/1997 Nakata et al. .................. 363/17
(Continued)

FOREIGN PATENT DOCUMENTS
EP    0 871 285    10/1998
(Continued)

OTHER PUBLICATIONS
International Search Report, May 8, 2008.
(Continued)

*Primary Examiner*—Harry Behm
(74) *Attorney, Agent, or Firm*—Collard & Roe, P.C.

(57) ABSTRACT

A method for an inverter, for inputting power output by a direct current voltage source in an alternating current voltage network chops the direct current voltage source by a bridge inverter by alternate switching of parallel-mounted and series-mounted circuit elements, in the form of a pulse width modulation, and the chopped power is transmitted via a transformer which is connected between the series-mounted elements. The transmitted power is then rectified and input in the alternating current voltage network via a down-converter transformer. In order to adapt the inverter to the power supplied, the switching times of the circuit elements of the bridge inverter are controlled or regulated. In order to provide a simple way of enhancing performance, the power output by the direct current voltage source is detected in particular on a cyclic or permanent basis and the switching times of the circuit elements of the bridge inverter, in particular the idle times and/or the interval duration and or the frequency for pulse width modulation, for switching the circuit elements are adjusted based on the detected power of the direct current voltage source.

5 Claims, 3 Drawing Sheets

U.S. PATENT DOCUMENTS

| | | | |
|---|---|---|---|
| 5,719,758 A * | 2/1998 | Nakata et al. | 363/98 |
| 5,801,519 A * | 9/1998 | Midya et al. | 323/222 |
| 6,294,954 B1 * | 9/2001 | Melanson | 330/10 |
| 6,452,816 B2 * | 9/2002 | Kuranuki et al. | 363/17 |
| 6,597,159 B2 * | 7/2003 | Yang | 323/283 |
| 2002/0001210 A1 | 1/2002 | Kuranuki et al. | |
| 2003/0012038 A1 | 1/2003 | Welches et al. | |

FOREIGN PATENT DOCUMENTS

| | | |
|---|---|---|
| EP | 1 337 033 | 8/2003 |
| JP | 05 244775 | 1/1994 |
| JP | 08-228488 | 9/1996 |
| JP | 09 047082 | 6/1997 |
| JP | 10 304675 | 2/1999 |

OTHER PUBLICATIONS

Calais et al., "Multilevel converters for single-phase grid connected photovoltaic systems: an overview," *Solar Energy, Pergamon Press,* Oxford, GB, vol. 66, No. 5. Aug. 1999, pp. 325-335. (ISR).

Calais M et al: "Multilevel converters for single-phase grid connected photovoltaic systems: an overview" *Solar Energy, Pergamon Press.* Oxford, GB vol. 66, No. 5. August 1000 (Aug. 1999), pp. 325-335—To Follow.

\* cited by examiner

METHOD FOR SETTING SWITCHING TIMES, IN PARTICULAR IDLE TIMES, OF AN INVERTER BASED ON DETECTED POWER, AND INVERTER

CROSS REFERENCE TO RELATED APPLICATIONS

Applicants claim priority under 35 U.S.C. 119 of Austrian Application No. A 1733/2003 filed Oct. 31, 2003. Applicants also claim priority under 35 U.S.C. 365 of PCT/AT2004/000382 filed Oct. 29, 2004. The international application under PCT article 21(2) was not published in English.

The invention relates to a method for an inverter, in particular for a solar inverter, for feeding energy produced by a d.c. voltage source into an a.c. voltage grid, in which the produced energy of the d.c. voltage source is chopped in the form of a pulse width modulation by a bridge inverter, by alternate switching of switching elements connected in parallel and connected in series, and this chopped energy is transmitted via a transformer which is connected between the switching elements that are connected in series, whereupon the energy transmitted is rectified again and fed into the a.c. voltage grid via a buck chopper, wherein, for a power adaptation, the switching times of the switching elements of the bridge inverter are controlled, or regulated, respectively.

Furthermore, the invention relates to an inverter, in particular to a solar inverter, for feeding energy produced by a d.c. voltage source into an a.c. voltage grid, comprising a bridge inverter, a transformer, a rectifier, a back chopper including a full bridge and an output filter, a control device being provided for controlling the parameters of the inverter.

In the inverters, in particular solar inverters, known from the prior art, the assembly preferably consists of a bridge inverter, a transformer, a rectifier, a buck chopper including a full bridge and an output filter. A d.c. voltage source, in particular a solar module, is connected to the inverter, whereas the output of the inverter is connected to an a.c. voltage grid for feeding in energy. The energy produced by the d.c. voltage source is chopped by the bridge inverter in the form of a pulse width modulation, by alternating switching of switching elements connected in parallel and connected in series, and this chopped energy is transmitted via the transformer which is connected between the switching elements that are connected in series, whereupon the energy transmitted is rectified again and is fed into the a.c. voltage grid via a buck chopper.

JP 08-228488 A, JP 09-047082 A as well as EP 0 871 285 A1 describe devices and methods for setting the dead times of inverters as a function of an output parameter.

With the solar inverters known from the prior art it is disadvantageous that a power adaptation of the inverter is possible only via the pulse width modulation of the bridge inverter, whereby it is not always ensured that the latter is operated at an optimum. If, for instance, less energy is delivered by the d.c. voltage source, it may happen that the pulse width is reduced to an extent that a further control or regulation via the pulse width is no longer possible. In case of an excessively high energy supply via the d.c. voltage source this may also happen, since in this case the pulse width is adjusted to the maximum so that, again, further control or regulation will no longer be possible.

Therefore, the object of the present invention consists in providing a method for an inverter for feeding an energy produced by a d.c. voltage source into an a.c. voltage grid, and of an inverter, with the degree of effectiveness being substantially increased in a simple form.

With regard to the method, the object according to the invention is achieved in that the energy produced by the d.c. voltage source is detected in particular at cyclical intervals or permanently, and in that the switching times of the switching elements of the bridge inverter are set as a function of the detected energy of the d.c. voltage source.

Thus, an adaptation of the inverter to the input power delivered is possible in a simple form. It is thereby ensured that the inverter can always be optimally regulated, whereby the degree of effectiveness is substantially increased. By adapting the switching times of the switching elements it is ensured that the parasitic capacities stored in the switching elements of the bridge inverter can be completely recharged and no excessively long switching pauses can occur at the same time. By changing the frequency of the switching times, it is achieved that the switching losses will be reduced proportionally, and thus, the degree of effectiveness of the circuit will be substantially improved.

Here, the dead time of the switching elements for switching over from one switching element to a further switching element, connected in series, of the bridge inverter can be set as a function of the energy detected.

As an alternative or in addition to the dead time, also the period duration, or frequency, respectively, for the pulse width modulation for switching over from one switching element to a further switching element, connected in series, of the bridge inverter can be set as a function of the energy detected.

Advantageously, the switching times of the switching elements of the bridge inverter are evaluated as a function of the energy detected and are set automatically.

According to a further feature of the invention, the switching times of the switching elements of the bridge inverter are calculated as a function of the energy detected, or are chosen from a table comprising respective deposited data, in which table, for instance, for various mean values respective values have been deposited for the switching times, in particular for the dead time and/or for the pulse duration, or the frequency, respectively.

Moreover, the switching times of the switching elements of the bridge inverter can be set as a function of the mean value of the current flowing over the primary winding of the transformer. Measurement of the mean value of the current flowing over the primary winding of the transformer is one possible way of detecting the energy of the d.c. voltage source.

Advantageously, the switching elements are activated at appropriately fixed points of time.

Moreover, the object of the invention is also achieved by an above-mentioned inverter, in particular by a solar inverter, wherein a device for detecting the energy produced by the d.c. voltage source is provided, which device is connected to the control device, and wherein the bridge inverter is designed for adapting the switching time, in particular the dead time for switching over of the switching elements and/or a pulse duration, or frequency, respectively, for the pulse width modulation as a function of the energy detected.

The device for detecting the energy produced by the d.c. voltage source, in particular by the solar module, may be a current measurement device at the primary side of the transformer.

Even though the present description is mainly directed to solar inverters, the present invention may also be utilized in other inverters.

The present invention will be explained in more detail by way of the accompanying drawings which illustrate exemplary embodiments for the method and for the solar inverter.

Therein,

Figure 1:
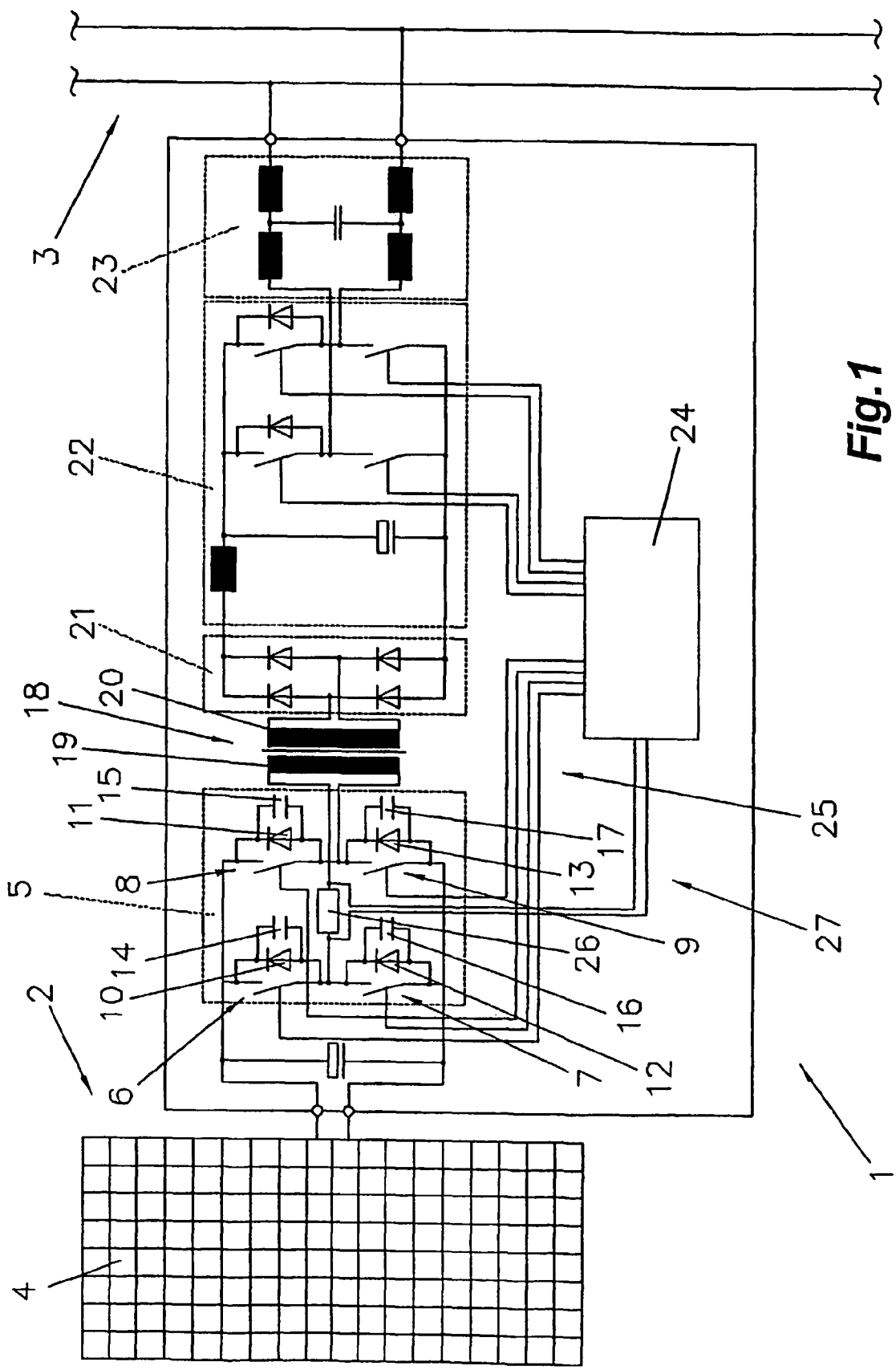
FIG. 1 shows a block diagram of a solar system comprising a solar inverter for feeding into an a.c. voltage grid, in a simplified, schematic representation.

In FIG. 1, a schematic circuit diagram of a solar inverter 1 for feeding energy produced by a d.c. voltage source 2 into an a.c. voltage grid 3 is shown. Additional protection devices, e.g. to protect against overload, short circuit etc., have not been illustrated in the diagram to provide for a better overview.

The d.c. voltage source 2 is formed by a solar module 4, e.g., for the production of energy by solar radiation. It is also possible to provide a fuel cell, e.g., instead of the solar module 4 or in addition thereto. The solar module 4 is connected to a solar inverter 1. The solar inverter 1 consists of a bridge inverter 5 at which several switching elements 6 to 9, such as, e.g., thyristors, transistors or the like, are arranged in bridge circuit so that always two switching elements 6, 8 and 7, 9 are connected in series. The full bridge is formed by two half-bridges connected in parallel with each other. Instead of the full bridge shown, it is, of course, also possible to use only one half-bridge, i.e. two switching elements 6 and 8 or 7 and 9. In parallel with each switching element 6 to 9, one diode 10 to 13 each and, as schematically illustrated, one parasitic capacity 14 to 17 each are arranged. Of course, in parallel with the diodes 10 to 13, or the connecting elements 6 to 9, respectively, additional capacitors 14 to 17 can be connected in parallel with the parasitic capacities.

Furthermore, the solar inverter 1 includes a transformer 18 in which the primary side, i.e. the primary winding 19, is connected between the two switching elements 6, 8 and 7, 9 which are connected in series, i.e. at the center of the switching elements 6 to 9. On the secondary side of the transformer 18, i.e. at the secondary winding 20, a rectifier 21, a smoothing filter choke with intermediate circuit capacitor, a buck chopper 22 with a full bridge connected thereto, as well as an output filter 23 are connected, from which output filter 23 feeding into the a.c. voltage grid 3 is effected.

Moreover, the solar inverter 1 has a control device 24 by means of which controlling of the individual circuit components or circuit groups of the solar inverter 1 is effected. For this purpose, schematic control lines 25 to the individual switching elements 6 to 9 have been entered in the drawing. In order to be able to determine the energy produced, a current measurement unit 26 is arranged at the primary side of the transformer 18, which measurement unit is formed by a shunt resistor. The current measurement unit 26 is connected to the control device 24 via measurement lines 27. Thus, the current, or voltage, respectively, flowing over the current measurement unit 26 or the energy can be detected by the control device 24.

The functions of the individual circuit members or circuit groups, respectively, of the solar inverter 1, are not further described, as they are already sufficiently known from the prior art. It is only mentioned briefly that the energy produced by the d.c. voltage source 2 is chopped by the bridge inverter 5 by alternate switching of the switching elements 6 to 9, connected in parallel and connected in series, of the full bridge, and transmitted via the transformer 18. The energy transmitted by the transformer 18 in turn is rectified by the rectifier 21 and finally fed into the a.c. voltage grid 3 via the buck chopper 22 and the full bridge following thereafter and the output filter 23. By modulating the pulse width, the energy transmitted can be changed.

Figure 2:
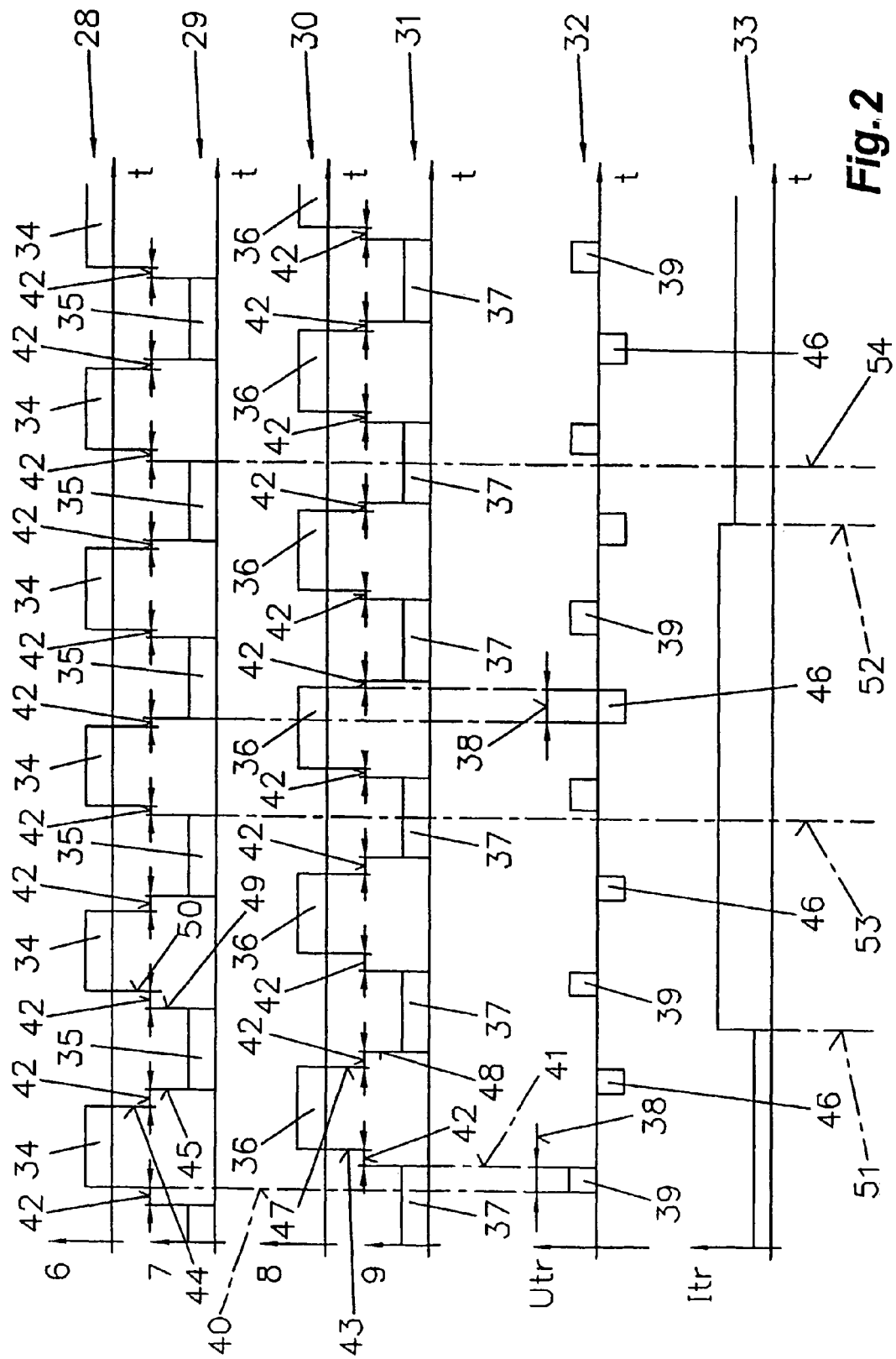
FIG. 2 shows a diagram of the switching sequence of a bridge inverter of the solar inverter in a simplified, schematic representation.
Figure 3:
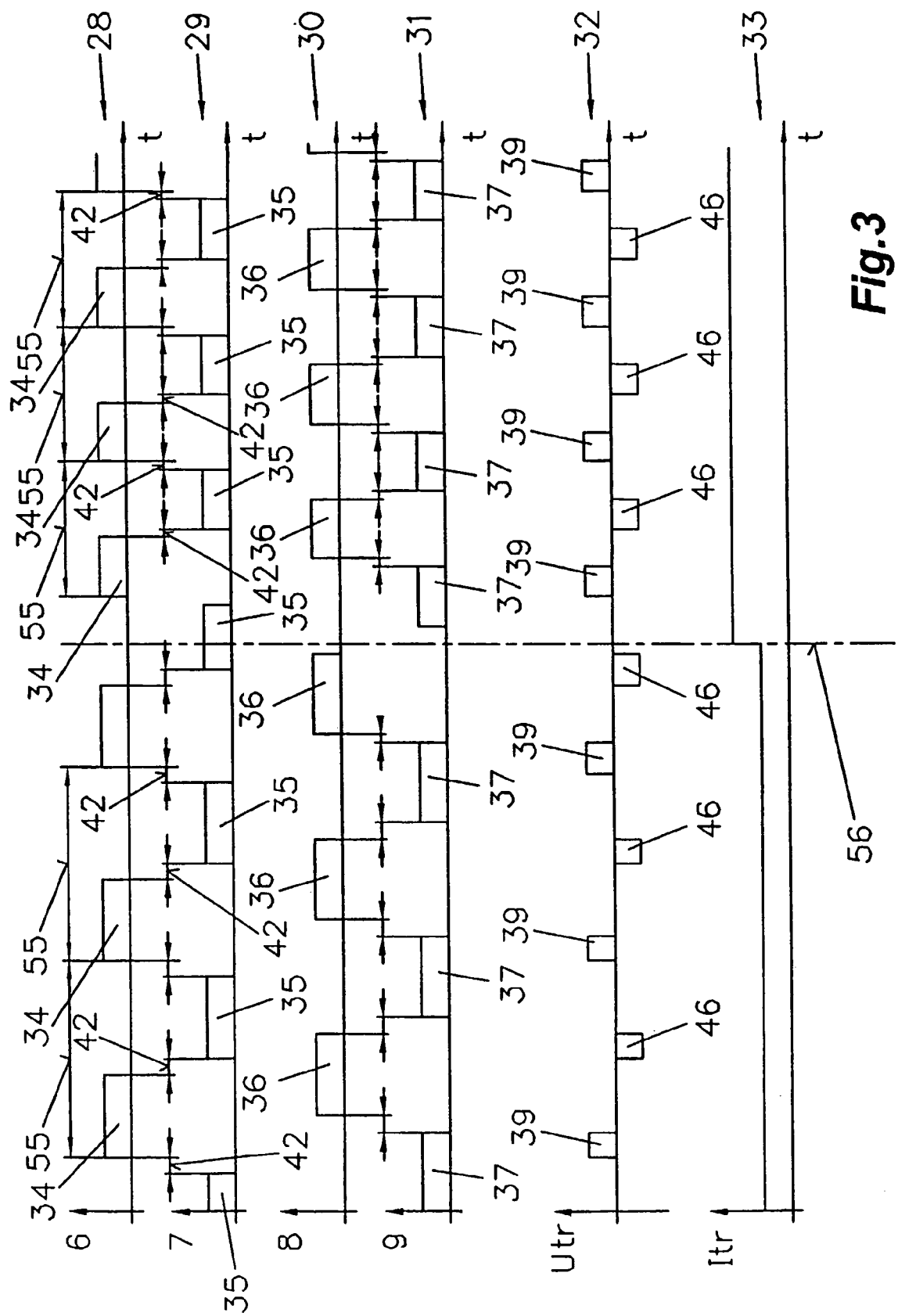
FIG. 3 shows a further diagram of the control sequence in a simplified, schematic representation.

FIGS. 2 and 3 now illustrate a novel activation of the bridge inverter 5. For this purpose, in the diagrams 28 to 33 simplified, optimized signal courses of the control signals for activating the switching elements 6 to 9 of the bridge circuit, the voltage $U_{tr}$ at the transformer 18 as well as the current $I_{tr}$ through the current measurement unit 26 as a function of time are illustrated.

In known solar inverters 1, particularly in the bridge inverters 5 arranged therein on the primary side of the transformer 18, activation and switching over is effected by a fixed defined frequency as well as by a fixed defined switching time, or a switching sequence, respectively, particularly a fixed defined dead time. In known systems, a power adaptation, or power change, respectively, of the solar inverter 1 is effected via pulse width modulation, wherein, depending on the amount of energy delivered, the pulse width, i.e. the switched-on duration of the switching elements 6 to 9 of the bridge inverter 5 is changed.

As can be seen from FIG. 2, the course of a pulse width modulated bridge inverter 5 is such that always two switching elements 6, 9 and 7, 8 are alternately activated. This is visible in the diagrams by corresponding activation pulses 34 to 37 for the switching elements 6 to 9, which pulses are emitted from the control device 24. Energy will flow over the primary winding 19 of the transformer 18 if the switching elements 6 and 9 as well as 7 and 8 are simultaneously connected through. In the illustrations, this corresponds to those times during which the control pulses 34 and 37 of the switching elements 6 and 9 as well as 35 and 36 of the switching elements 7 and 8 overlap each other. During these overlapping switching times 38, thus an energy transmission occurs via the transformer 18, as schematically illustrated by the voltage pulses 39 in the diagram of the temporal course of the transformer voltage $U_{tr}$.

If, e.g., the switching elements 6 and 9 are activated at the same time, energy can be transmitted via the transformer 18 during the switching time 38, starting from a point of time 40. An activation of the switching elements 7 and 8 causes an energy transmission with a reversal of the polarity of the voltage at the transformer 18. The switching-over procedure is such that, e.g., at point of time 41, the switching element 9 is deactivated, and after a so-called dead time 42 has passed, the switching element 8 is activated at point of time 43. Subsequently, at point of time 44, the switching element 6 is deactivated, and the switching element 7 is activated again by the control device 24 at point of time 45, after a dead time 42 has passed. Thus, switching over from the switching elements 6 and 9 to the switching elements 7 and 8 has been carried out. Consequently, a flow of current can occur over the primary winding 19 of the transformer 18 in the opposite direction, as illustrated by a now negative voltage pulse 46, so that further energy transmission will occur to the secondary side of the transformer 18. In order to switch over again to the switching elements 6 and 9, the switching element 8 is deactivated at point of time 47, and the switching element 9 is activated at point of time 48, after the dead time 42 has passed, whereupon the switching element 7 is deactivated at point of time 49, and the switching element 6 is activated at point of time 50, after the dead time 42 has passed. This alternating, cross-wise switching of the switching elements 6 to 9 of the bridge circuit is repeated periodically so that a corresponding energy transmission can occur. The switch-on duration of the individual switching elements 6 to 9 is controlled by the pulse width, resulting in correspondingly longer or shorter voltage pulses 39 and 46 at the transformer 18 for the energy transmission, whereby a corresponding power change can be accomplished. Activation of the switching elements 6 to 9 by the control device 24 preferably is always carried out at appropriately fixed points of time.

It is, of course, also possible to effect the switch-over procedure from one pair of switching elements 6 and 9 to the other pair of switching elements 7 and 8, in a different sequence. Starting out from activated switching elements 6, 9, e.g., at first switching element 6 may be deactivated and subsequently switching element 7 may be activated, and thereafter switching element 9 may be deactivated and switching element 8 may be activated. Subsequently, switching element 7 is deactivated again and switching element 6 is activated, whereupon switching element 8 is deactivated and switching element 9 is activated. Switching over, or activation, respectively, of the individual switching elements 6 to 9 again is effected after passage of the dead time 42, as described before. What is essential is that always an alternating, cross-wise switching of the switching elements 6 to 9 is carried out, and that during the switching-over procedure, always two switching elements 6 to 9 lying at the same potential are simultaneously activated for a short time.

By this, it is achieved that the inductively stored energy in transformer 18 re-charges the capacitors 14 to 17 until a voltage-free switching over of the switching elements 6 to 9 is feasible.

In order for said recharging to be possible, the dead times 42 are provided between the deactivation and the activation of the switching elements 6 to 9, in which dead times a re-charging of the energy may occur. If switching over occurs too early so that not the entire energy stored has been recharged, this energy will be destroyed when switching on, or activating, respectively, the next switching element 6 to 9, leading to high switching losses, said switching losses increasing proportionally to the square of the voltage when switching off, or switching on, respectively, under energy flow. If, on the other hand, switching over, i.e. the dead time 42, is chosen to be too long, the entire energy stored will be re-charged, yet the solar inverter 1 will not be operated at its optimum, since due to the long switching times, pauses will form during the energy transmission and, by this, the voltage-time-window for energy transmission is reduced.

According to the invention, the control of the solar inverter 1, in particular of the bridge inverter 5, is such that a switching over adapted to the energy of the d.c. voltage source 2, in particular of the solar module 4, is effected by adapting the dead time 42. Depending on the energy supplied by the d.c. voltage source 2, the dead time 42 for switching on and off the switching elements 6 to 9 is defined accordingly, so that always the entire energy of the parasitic and external capacities 14 to 17 can be recharged, while, however, at the same time no overly long switching pauses can form for the energy transmission via the transformer 18. For, if less energy is delivered by the d.c. voltage source 2, more time (dead time 42) will be required so as to recharge the parasitic and external capacitors 14 to 17 than is the case when much energy is delivered by the d.c. voltage source 2.

For this purpose, a detection of the energy delivered by the d.c. voltage source 2 is necessary, as is effected by a current measurement unit 26, e.g. By this, an appropriate evaluation of the energy supplied is enabled by the control device 24 of the solar inverter 1 and, thus, an automatic fixing of the switching times, in particular of the dead time 42, is carried out. Evaluation and fixing of the points of time of switching may be effected in the most varying ways.

The dead time 42 may, e.g., be determined as a function of the mean value of the current $I_{tr}$ through the primary winding 19 of the transformer. This is done such that at certain points of time, e.g. after a presettable period of time has passed, the control device 24 detects the values delivered by the current measurement unit 26 and forms a mean value therefrom. If this mean value has changed compared to a previously determined mean value, a new dead time 42 is fixed. Thus, a new dead time 42 will not be fixed after each switching-over period, but only after several switching-over periods. The dead time 42 may be determined by a calculation or by appropriately stored data, i.e. by a table in which, e.g., dead times 42 corresponding to the most varying mean values are stored.

It is, however, also possible to continuously monitor the flow of energy and for the control device 24 to react to a change of the energy flow, thereby fixing a new dead time 42. Such an example is illustrated in FIG. 2, in which a change in the dead time 42 is carried out immediately in the subsequent switching-over period, when the energy flow has changed. This can be seen from the diagrams belonging to the points of time 51, 52. There, the mean energy flow over the primary winding 19 of the transformer 18 at point of time 51 increases, whereupon the control device 24 will recognize that now more energy is delivered by the d.c. voltage source 2 and, thus, more energy is stored in the parasitic capacity. Subsequently, the control device 24 will fix a new dead time 42 which now is shorter in comparison with the previous dead time 42, which new dead time will be applied in the next switching-over period, as visible starting from the point of time 53. In the exemplary embodiment illustrated, the change of the dead time 42 will always be carried out after a switching-over period, i.e. after a switching-over of all the switching elements 6 to 9 has been carried out once. It is, however, also possible to carry out an adaptation of the dead time 42 with the next switching procedure, immediately after having recognized an energy flow change. At point of time 52, the energy flow decreases again, so that a new adaptation of the dead time 42 will be effected, since now less energy is stored again in the parasitic inductivity. This new dead time 42 is used by the control device 24 after having concluded the last switching-over period, as is visible at point of time 54. Since there will be a reduced current flow again starting from point of time 52, the dead time 42 will be increased as compared to the previous dead time 42 so as to allow for a complete re-charging of the energy stored in the parasitic capacitors 14 to 17.

Thus, it can be said that, depending on the energy flow on the primary side of the transformer 18, a corresponding adaptation of the dead time 42 is effected, so that a substantial increase in the degree of effectiveness of the inverter is achieved. There is no longer just an adaptation of the pulse width, but the switching times for the switching elements 6 to 9 are optimized accordingly. What is essential, thus, is that the switching time, in particular the dead time 42, for switching over from one switching element 6 to 9 to a further switching element 6 to 9 connected in series, of the bridge inverter 5, is set by the connected d.c. voltage source 2 as a function of the energy produced. In doing so, the energy produced by the d.c. voltage source 2 is detected in particular at cyclical intervals, and the switching time, in particular the dead time 42, is established, or determined, respectively, in accordance with the energy detected.

To achieve a further improvement in the degree of effectiveness of a solar system, a further possible way for an adaptation to the input performance of the solar inverter 1 is illustrated in the exemplary embodiment according to FIG. 3 described hereinafter. Again, the individual diagrams 28 to 33 are illustrated, as already shown in FIG. 2.

In this exemplary embodiment, an adaptation of the frequency or period duration 55, respectively, for the pulse width modulation is carried out in addition to the adaptation of the dead time 42 according to FIG. 2. Depending on the input performance prevailing, the period duration 55, or the switching frequency, respectively, for the switching elements 6 to 9 is changed, as is the case with the dead time 42. It is, of course, also possible for the solar inverter 1 to be constructed such that there will be only a change in the dead time 42 as a function of the energy delivered, or only a change of the period duration 55, or frequency, respectively, as a function of the energy delivered. Moreover, also a setting option may be provided, where the user may choose between changing the dead time 42, and changing the period duration 55, or frequency, respectively, or may elect both options.

With an appropriate input energy, in the exemplary embodiment according to FIG. 3 illustrated, the solar inverter 1, in particular the bridge inverter 5, works with a fixed period duration 55, or frequency, respectively. If the input energy changes, i.e. if the former is increased or reduced, this will be recognized by the control device 24, whereupon a corresponding change of the period duration 55, or frequency, respectively, will be effected. This is shown at the point of time 56, at which an increase in the input energy occurs, as is apparent from the current course $I_{tr}$ according to diagram 33. Thus, a new period duration 55, or frequency, as well as a new dead time 42 is calculated, or set, respectively, by the control device 24, and used in the next switching-over period.

Setting of the new period duration 55, or frequency, respectively, may be effected as described before in FIG. 2, i.e. the energy delivered by the d.c. voltage source 2 is detected so that a corresponding evaluation of the energy delivered will be enabled by the control device 24 of the solar inverter 1 and, thus, the period duration 55, or frequency, respectively, and/or the switching times, in particular the dead time 42, will be set automatically by this control device. Setting of the dead time 42 and/or of the period duration 55, or frequency, respectively, may, however, also be effected by a calculation or by appropriately stored data, i.e. by a table in which, e.g., period durations 55, or frequencies, respectively, and/or dead times 42 are stored which are related to the most varying mean values. In this respect, setting of the dead time 42 and/or of the period duration 55, or frequency, respectively, occurs, for instance, on the basis of the mean value of the current flow $I_{tr}$ through the primary winding 19 of the transformer 18. Yet, it is also possible for the energy flow to be constantly monitored and for the control device 24 to react at a change of the energy flow, whereby a new dead time 42 and/or period duration 55, or frequency, respectively, is set.

The advantage of adapting the period duration 55, or frequency, respectively, to the energy delivered resides in that always the entire pulse width can be utilized and, thus, an optimum operation will be ensured and, by this, the frequency-dependent switching losses will be reduced. By the combination with the change of the dead time 42, it is also ensured that always the entire parasitic capacities can be recharged, without the possibility of high switching losses occurring, or of excessively long switching pauses for energy transmission being prevented.

It is also possible for a special switch-over procedure to be carried out for changing the dead time 42 and/or the period duration 55, or frequency, respectively. In this respect, it would be possible to run the final switching period, e.g., and subsequently to provide a short switching pause for the bridge inverter 5, whereupon, when the bridge inverter 5 is activated again, the new period duration 55, or frequency, respectively, and/or dead time 42 will be used. This would have the advantage that by this always a certain starting procedure, in particular a certain defined switching procedure, will be obtained with the same switching elements 6 to 9.

The invention claimed is:

1. A solar inverter for feeding current produced by a d.c. voltage source into an a.c. voltage grid, said d.c. voltage source being formed by a solar module, said inverter comprising a bridge inverter, a transformer having a primary winding, a rectifier, a buck chopper including a full bridge and an output filter;
    wherein a control device is provided for controlling the parameters of the inverter;
    wherein a device for detecting the current produced by the d.c. voltage source and flowing over the primary winding of the transformer is provided, which device is connected to the control device; and
    wherein the bridge inverter is designed for adapting a dead time for the switching elements as a function of the mean value of the current detected flowing over the primary winding of the transformer by selecting the dead time from a table with correspondingly stored data for the most varying mean values, the dead time representing a time of the switching elements for switching over from one switching element to a further switching element connected in series of the bridge inverter, thereby ensuring that parasitic capacitances stored in the switching elements of the bridge inverter can be completely recharged and no excessively long switching pauses can occur at the same time.

2. A method for a solar inverter for feeding current produced by a d.c. voltage source formed by a solar module into an a.c. voltage grid comprising the steps of:
    (a) chopping the current produced by the d.c. voltage source in a form of a pulse width modulation by a bridge inverter by alternate switching of switching elements connected in parallel and connected in series;
    (b) transmitting the current chopped via a transformer connected between the switching elements that are connected in series, the transformer having a primary winding; and
    (c) rectifying the current transmitted and feeding the current into the a.c. voltage grid via a buck chopper;
    wherein, for a power adaptation, the switching times of the switching elements of the bridge inverter are controlled, or regulated;
    wherein the current produced by the d.c. voltage source is detected from current flowing over the primary winding of the transformer continuously or at cyclical intervals, and
    wherein a dead time of the switching elements of the bridge inverter is set as a function of the mean value of the detected current of the d.c. voltage source flowing over the primary winding of the transformer by selecting the dead time from a table with correspondingly stored data for the most varying mean values, the dead time representing a time of the switching elements for switching over from one switching element to a further switching element connected in series of the bridge inverter, thereby ensuring that parasitic capacitances stored in the switching elements of the bridge inverter can be completely recharged and no excessively long switching pauses can occur at the same time.

3. The method according to claim 2, wherein a period duration or a frequency for the pulse width modulation for switching over the switching elements of the bridge inverter is set as a function of the current detected.

4. The method according to claim 2, wherein the switching times of the switching elements of the bridge inverter are evaluated as a function of the current detected and set automatically.

5. The method according to claim 2, wherein the switching elements are activated at appropriately set points of time.

* * * * *